(12) United States Patent
Lorenz

(10) Patent No.: US 11,440,638 B2
(45) Date of Patent: Sep. 13, 2022

(54) WING FOR AN AIRCRAFT

(71) Applicant: Airbus Operations GmbH, Hamburg (DE)

(72) Inventor: Christian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 547 days.

(21) Appl. No.: 16/401,142

(22) Filed: May 2, 2019

(65) Prior Publication Data

US 2019/0337605 A1 Nov. 7, 2019

(30) Foreign Application Priority Data

May 3, 2018 (DE) ...................... 10 2018 110 560.6

(51) Int. Cl.
*B64C 3/56* (2006.01)

(52) U.S. Cl.
CPC ...................... *B64C 3/56* (2013.01)

(58) Field of Classification Search
CPC .... B64C 3/56; B64C 1/30; B64C 3/00; B64C 3/42; B64C 5/08; B64C 5/10; B64C 23/65; B64C 23/72; Y02T 50/30; Y02T 50/10
See application file for complete search history.

(56) References Cited

U.S. PATENT DOCUMENTS

| | | | | |
|---|---|---|---|---|
| 262,451 A * | 8/1882 | McFarlane | ............. | B62D 7/023 280/137.504 |
| 1,819,794 A * | 8/1931 | Schultze | ................... | B64C 3/56 244/49 |
| 2,289,224 A * | 7/1942 | Anderson | ................. | B64C 3/56 244/49 |
| 2,468,425 A * | 4/1949 | Carpenter | ................. | B64C 3/56 74/520 |
| 2,712,421 A * | 7/1955 | Naumann | ................. | B64C 3/56 244/49 |
| 2,719,682 A * | 10/1955 | Handel | ...................... | B64C 3/56 244/49 |
| 2,881,989 A * | 4/1959 | Flettner | ................... | B64C 27/26 244/6 |
| 2,881,994 A * | 4/1959 | Michael | .................... | B64C 3/26 244/124 |
| 3,039,721 A * | 6/1962 | Rogers, Jr. | ............. | B64D 37/04 244/135 R |

(Continued)

FOREIGN PATENT DOCUMENTS

| | | |
|---|---|---|
| GB | 490964 | 8/1938 |
| GB | 686646 | 1/1953 |

*Primary Examiner* — Medhat Badawi
(74) *Attorney, Agent, or Firm* — Nixon & Vanderhye P.C.

(57) ABSTRACT

A wing (3) for an aircraft (1) including a fixed wing (5), a foldable wing tip portion (9) mounted to the fixed wing (5) via a first hinge (11) rotatable about a first hinge axis (13) between an extended position (15) and a folded position (17), and an actuation unit (19) arranged at the fixed wing (5) and coupled to the foldable wing tip portion (9) via a linkage (21) including a first link element (23) and a second link element (25), wherein the first link element (23) is mounted to a rotatable output (27) of the actuation unit (19) and is rotatably coupled to the second link element (25) via a second hinge (29), and wherein the second link element (25) is rotatably coupled to the foldable wing tip portion (9) via a third hinge (31).

17 Claims, 3 Drawing Sheets

(56) References Cited

U.S. PATENT DOCUMENTS

| | | | | |
|---|---|---|---|---|
| 3,333,792 | A * | 8/1967 | Alvarez-Calderon | B64C 3/54 244/218 |
| 4,061,195 | A * | 12/1977 | Pryor | A01B 73/044 172/456 |
| 4,247,062 | A * | 1/1981 | Brueckner | B64C 5/08 244/36 |
| 4,247,063 | A * | 1/1981 | Jenkins | B64C 5/08 244/91 |
| 4,497,461 | A * | 2/1985 | Campbell | B64C 9/00 244/99.3 |
| 4,717,093 | A * | 1/1988 | Rosenberger | F42B 10/16 244/49 |
| 5,040,747 | A * | 8/1991 | Kane | B64C 25/26 244/102 R |
| 5,072,894 | A * | 12/1991 | Cichy | B64C 5/08 244/91 |
| 5,229,921 | A * | 7/1993 | Bohmer | G06F 1/1679 16/324 |
| 5,288,037 | A * | 2/1994 | Derrien | B64C 25/26 244/102 SL |
| 5,310,138 | A * | 5/1994 | Fitzgibbon | B64C 3/56 244/49 |
| 5,988,563 | A * | 11/1999 | Allen | B64C 3/56 244/49 |
| 6,227,487 | B1 * | 5/2001 | Clark | B64C 23/072 244/99.12 |
| 6,345,790 | B1 * | 2/2002 | Brix | B64C 23/076 244/199.4 |
| 7,137,589 | B2 * | 11/2006 | Arata | B64C 27/26 244/6 |
| 7,497,403 | B2 * | 3/2009 | McCarthy | B64C 23/072 244/199.4 |
| 8,276,842 | B2 * | 10/2012 | Kracke | B64C 13/28 244/99.4 |
| 8,651,431 | B1 * | 2/2014 | White | B64C 23/076 244/218 |
| 8,733,692 | B2 * | 5/2014 | Kordel | B64C 23/072 244/49 |
| 8,777,153 | B2 * | 7/2014 | Parker | B64C 3/56 244/49 |
| 8,919,703 | B2 * | 12/2014 | Parker | B64C 7/00 244/215 |
| 8,998,132 | B2 * | 4/2015 | Burris | B64C 9/04 244/99.3 |
| 9,139,285 | B2 * | 9/2015 | Schlipf | B64C 3/56 |
| 9,162,755 | B2 * | 10/2015 | Guida | B64C 23/069 |
| 9,211,946 | B2 * | 12/2015 | Good | B64C 3/56 |
| 9,296,469 | B2 * | 3/2016 | Santini | B64C 3/56 |
| 9,415,857 | B2 * | 8/2016 | Fox | B64C 3/56 |
| 9,469,391 | B1 * | 10/2016 | Dong | B64C 23/076 |
| 9,469,392 | B2 * | 10/2016 | Fox | B64C 23/072 |
| 9,908,612 | B2 * | 3/2018 | Fox | B64C 3/56 |
| 9,914,523 | B2 * | 3/2018 | Good | B64C 3/56 |
| 10,189,557 | B2 * | 1/2019 | Boye | B64C 3/56 |
| 10,207,795 | B2 * | 2/2019 | Thompson | B64C 23/072 |
| 11,066,148 | B2 * | 7/2021 | Elenbaas | B64C 13/34 |
| 2004/0000619 | A1 * | 1/2004 | Barriety | B64C 3/52 244/219 |
| 2007/0262207 | A1 * | 11/2007 | Morgenstern | B64C 9/22 244/214 |
| 2009/0148302 | A1 * | 6/2009 | Leahy | B64C 27/463 416/224 |
| 2009/0224107 | A1 * | 9/2009 | McLean | B64C 23/069 244/199.4 |
| 2009/0302151 | A1 * | 12/2009 | Holmes | B64C 3/56 244/49 |
| 2010/0019080 | A1 * | 1/2010 | Schweighart | B64C 3/56 244/49 |
| 2010/0051742 | A1 * | 3/2010 | Schweighart | B64C 3/56 244/49 |
| 2011/0180657 | A1 * | 7/2011 | Gionta | B64C 3/56 244/49 |
| 2012/0292436 | A1 * | 11/2012 | Karem | B64C 3/56 244/49 |
| 2013/0001367 | A1 * | 1/2013 | Boer | B64C 23/072 244/199.3 |
| 2013/0056579 | A1 * | 3/2013 | Schlipf | B64C 3/56 244/49 |
| 2015/0191243 | A1 * | 7/2015 | Fujimoto | B64C 17/00 244/7 R |
| 2016/0090170 | A1 * | 3/2016 | Thompson | B64C 3/56 701/3 |
| 2016/0244145 | A1 * | 8/2016 | Thompson | B64C 23/072 |
| 2016/0251075 | A1 * | 9/2016 | Thompson | B64C 23/072 244/198 |
| 2017/0029089 | A1 * | 2/2017 | Alexander | B64C 3/40 |
| 2017/0043864 | A1 * | 2/2017 | Axford | B64C 3/56 |
| 2018/0237127 | A1 * | 8/2018 | Hewson | B64C 3/187 |
| 2019/0337605 | A1 * | 11/2019 | Lorenz | B64C 3/56 |

* cited by examiner

WING FOR AN AIRCRAFT

RELATED APPLICATION

This application claims priority to German Patent Application No. 10 2018 110 560.6, filed May 3, 2018, the entirety of which is incorporated by reference.

BACKGROUND AND SUMMARY OF INVENTION

The present invention relates to a wing for an aircraft, in particular to a foldable wing including a fixed wing and a foldable wing tip portion. A further aspect of the invention relates to an aircraft comprising such a wing.

Such a wing comprises a fixed wing for being mounted to a fuselage, and a foldable wing tip portion mounted to the fixed wing via a first hinge or hinges rotatable about a first hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the first hinge axis extends in a horizontal plane and/or in parallel to a chord line and/or in parallel to the wing surface and/or in a flight direction of the aircraft. Alternatively, when the foldable wing tip portion is foldable rearwards, the first hinge axis extends in a vertical direction and/or in a wing depth direction and/or in a direction transverse or perpendicular to the wing surface.

Further, the wing comprises an actuation unit for actuating the foldable wing tip portion for movement about the first hinge axis relative to the fixed wing, i.e. for movement between the extended and the folded positions. The actuation unit might be powered electrically and/or hydraulically.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

Different designs of the actuation unit have been proposed in the art. Generally, the actuation unit should be designed strong enough to reliably move the foldable wing tip portion between the extended and folded positions, but at the same time to have minimum weight and complexity in order to reduce costs of the related aircraft.

Accordingly, the present invention may be embodied to provide a wing having an actuation unit with reduced complexity and weight.

The actuation unit may be arranged at or mounted to the fixed wing and coupled to the foldable wing tip portion via a linkage including at least a first link element and a second link element. The first link element is fixedly mounted with its first end to a rotatable output, preferably to a rotatable output shaft, of the actuation unit and is rotatably coupled with its opposite second end to a first end of the second link element via a second hinge spaced from the output. In such a way, the first link element might form a drive arm mounted to and rotating with the output. Further, the second link element is rotatably coupled with its opposite second end to the foldable wing tip portion via a third hinge spaced from the second hinge. Such a linkage together with the first hinge forms a four-bar-linkage, which relates to a particularly advantageous kinematics for transferring actuation loads to the foldable wing tip portion and, therefore, allows to downsize the actuation unit, i.e. to reduce its complexity and weight.

Alternatively, the arrangement of the actuation unit and the linkage might also be reversed, so that the actuation unit is arranged at the foldable wing tip portion and is coupled to the fixed wing via the linkage, wherein the second link element is rotatably coupled to the fixed wing via the third hinge. This alternative arrangement also solves the above mentioned problem of the invention.

According to an embodiment, the output rotates about an output axis, the second hinge defines a second hinge axis, and the third hinge defines a third hinge axis. Further, the output axis and/or the second hinge axis and/or the third hinge axis extend in parallel to the first hinge axis. This relates to a particularly simple and effective design of the linkage.

According to a further embodiment, the third hinge is spaced apart from the first hinge in a tip thickness direction of the foldable wing tip portion. In such a way, a particularly efficient four-bar-linkage is formed.

In particular, at least in the extended position of the foldable wing tip portion the third hinge may be positioned lower than the first hinge, with respect to the tip thickness direction of the foldable wing tip portion in the extended position of an aircraft in normal position on the ground, wherein the first hinge axis preferably extends in a flight direction or chord direction. In such a way, the linkage pushes the foldable wing tip portion when it is moved upwards to the folded position, which is advantageous as it requires particularly low actuator loads from the actuation unit.

According to another embodiment, a distance between the third hinge and a tip point of the foldable wing tip portion is greater than a distance between the first hinge and the tip point, with respect to a tip span direction of the foldable wing tip portion. The tip point relates to an outermost point of the foldable wing tip portion furthest away from the fuselage. In such a way, a particularly efficient four-bar-linkage is formed that requires only minimum actuator loads.

In particular, the third hinge may be fixedly mounted to the foldable wing tip portion via a rod that extends away from an inner side of the foldable wing tip portion opposite the tip point. Such a rod extends close to the output of the actuation unit and leads to an advantageous kinematics where the required actuator loads are at a minimum.

The output may be spaced apart from the first hinge at least in a span direction of the fixed wing. In such a way, a particularly efficient four-bar-linkage is formed that requires only minimum actuator loads.

The ratio of a distance between the output and the second hinge to a distance between the first hinge and the third hinge may be below 1, such as below 0.9, below 0.8, or below 0.7. In such a way, actuation forces may be reduced and the actuation unit might be downsized.

The ratio of a distance between the output and the first hinge to a distance between the first hinge and the third hinge may be between 0.3 and 0.6, such as between 0.4 and 0.5 or equal to 0.42. In such a way, actuation forces may be reduced and the actuation unit might be downsized.

When the foldable wing tip portion is moved between the extended position and the folded position, the first link element rotates about an angle of, for example, between 120° and 180°, between 130° and 170°, between 140° and 160°, or an angle of approximately 150°, wherein approximately refers to within 10% of the value. The foldable wing tip portion rotates about an angle of, for example, between 70° and 100°, between 80° and 100°, and an angle of approximately 90°. In such a way, actuation forces may be reduced and the actuation unit might be downsized.

According to yet a further embodiment, at least in the extended position of the foldable wing tip portion the third hinge is positioned lower than the output, with respect to a thickness direction of the fixed wing, wherein the first hinge axis preferably extends in a flight direction or chord direction. In such a way, a particularly efficient four-bar-linkage is formed that requires only minimum actuator loads.

A further aspect of the present invention relates to an aircraft comprising the wing according to any of the embodiments described above. The features and effects described above in connection with the wing apply vis-à-vis to the aircraft.

SUMMARY OF FIGURES

Hereinafter, embodiments of the invention are described in more detail by mean of a drawing. The drawing shows in FIG. 1 is a perspective view of an aircraft according to an embodiment of the invention.

DETAILED DESCRIPTION OF INVENTION

Figure 1:
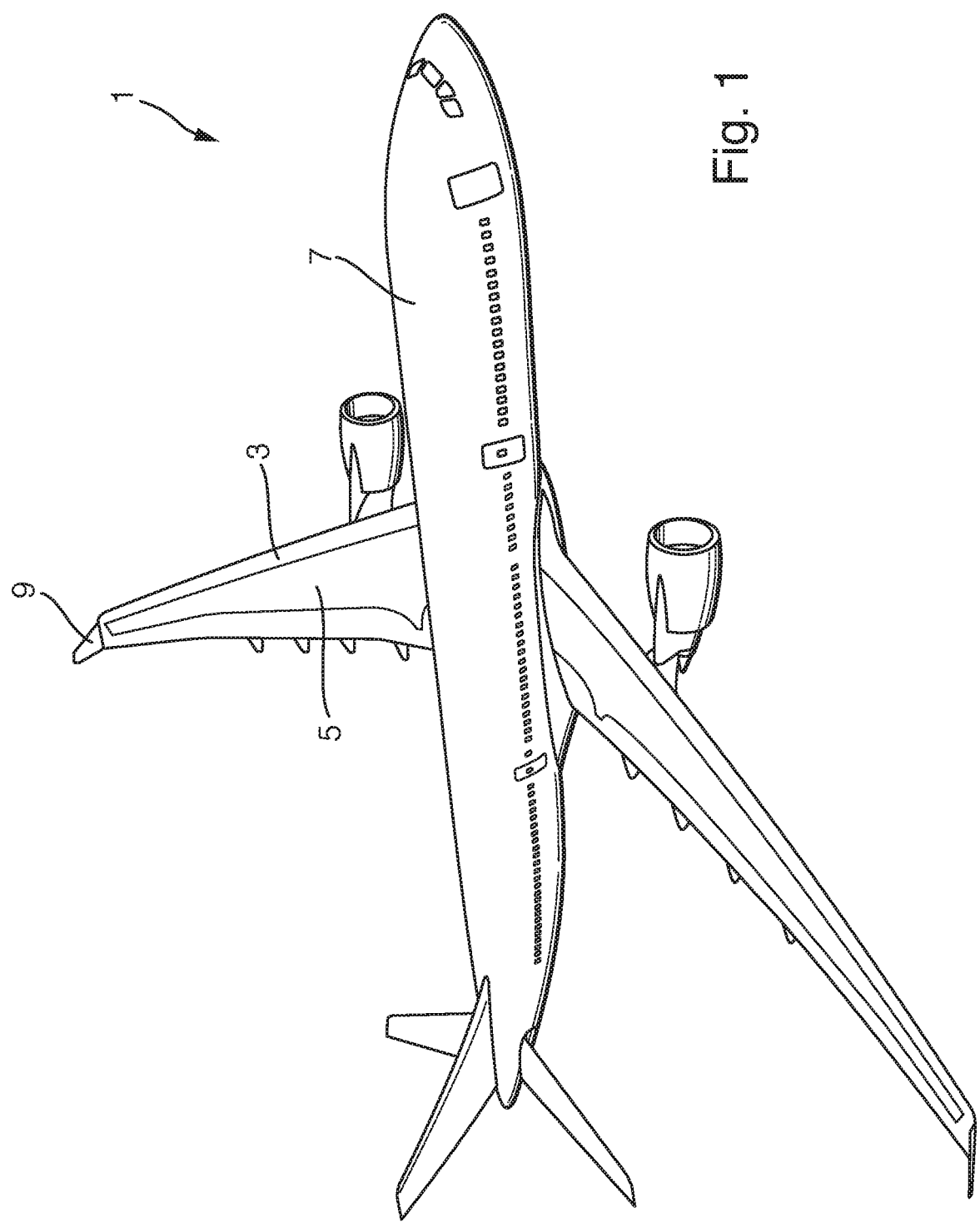

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
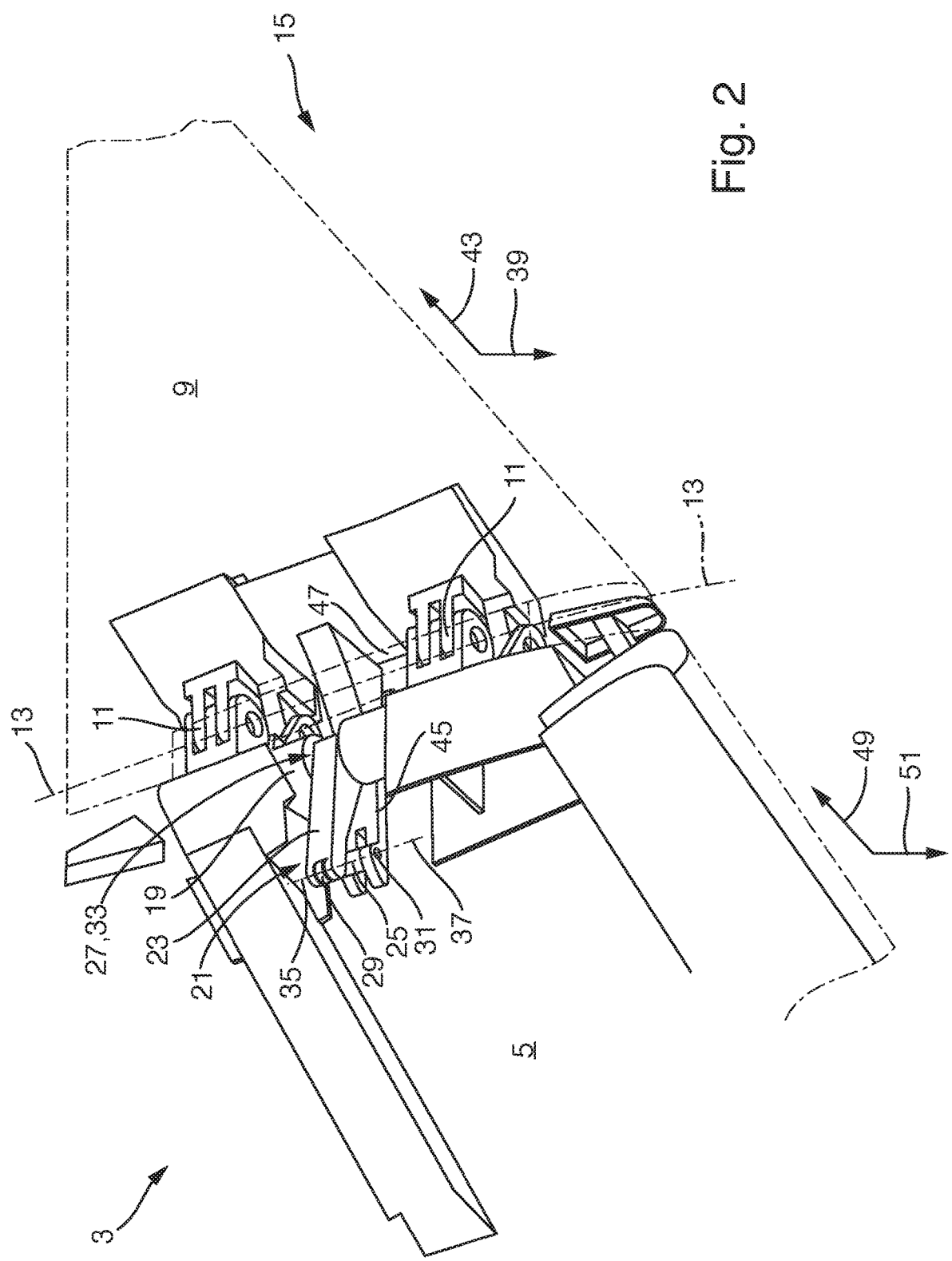
FIG. 2 is a perspective detailed view of the wing shown in FIG. 1 with a focus on the actuation unit and linkage.
Figure 3:
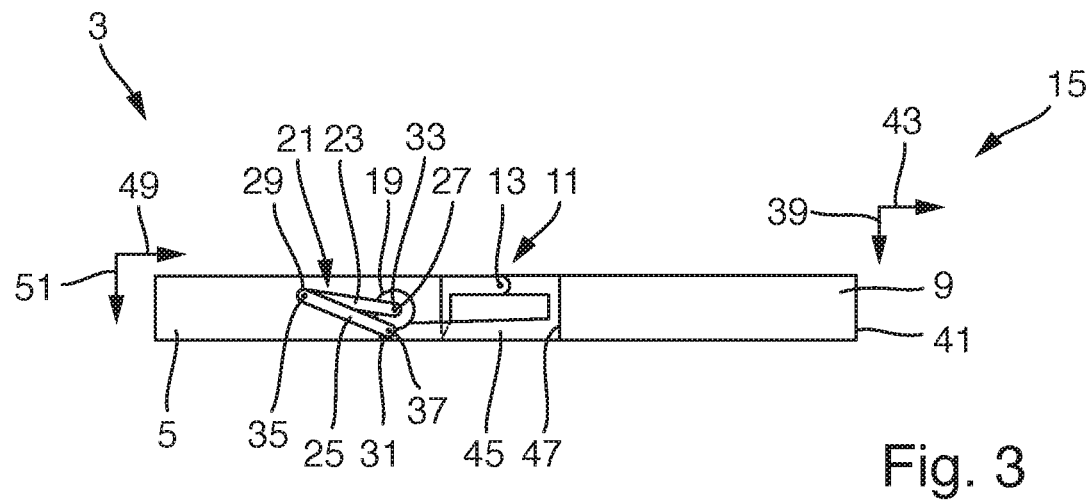
FIG. 3 is a schematic, functional illustration of the wing shown in FIG. 1, with the foldable wing tip portion in the extended position.
Figure 4:
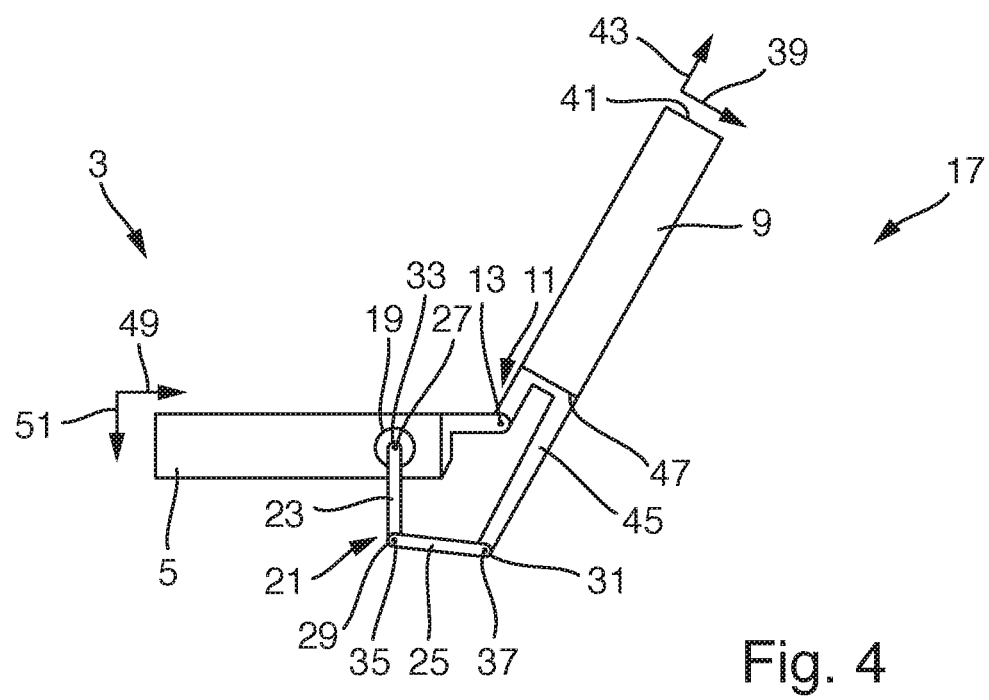
FIG. 4 is the schematic, functional illustration of the wing as shown in FIG. 3, with the foldable wing tip portion in the folded position.

FIGS. 2 to 4 illustrate the wing 3 of the aircraft 1 shown in FIG. 1 in further detail. The foldable wing tip portion 9 is mounted to the fixed wing 5 via first hinges 11 rotatable about a first hinge axis 13 between an extended position 15 (see FIGS. 2 and 3) and a folded position 17 (see FIG. 4). In the extended position 15 the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1.

Further, the wing 3 comprises an actuation unit 19 for moving the foldable wing tip portion 9 about the hinge axis 13 relative to the fixed wing 5. The actuation unit 19 is arranged at the fixed wing 5 and coupled to the foldable wing tip portion 9 via a linkage 21 including a first link element 23 and a second link element 25. The first link element 23 is fixedly mounted with its first end to a rotatable output 27 of the actuation unit 19 and is rotatably coupled with its opposite second end to a first end of the second link element 25 via a second hinge 29 spaced from the output 27. Further, the second link element 25 is rotatably coupled with its opposite second end to the foldable wing tip portion 9 via a third hinge 31 spaced from the second hinge 29. The linkage 21 together with the first hinge 11 forms a four-bar-linkage.

The output 27 defines an output axis 33, the second hinge 29 defines a second hinge axis 35, and the third hinge 31 defines a third hinge axis 37, wherein the output axis 33, the second hinge axis 35 and the third hinge axis 37 extend in parallel to the first hinge axis 13.

The third hinge 31 is spaced apart from the first hinge 11 in a tip thickness direction 39 of the foldable wing tip portion 9, wherein at least in the extended position 15 of the foldable wing tip portion 9 the third hinge 31 is positioned lower than the first hinge 11, with respect to the tip thickness direction 39 of the foldable wing tip portion 9 of an aircraft 1 in normal position on the ground. This means, the linkage 21 pushes the foldable wing tip portion 9 when it is moved upwards to the folded position 17.

A distance between the third hinge 31 and a tip point 41 of the foldable wing tip portion 9 is greater than a distance between the first hinge 11 and the tip point 41, with respect to a tip span direction 43 of the foldable wing tip portion 9. This is because the third hinge 31 is fixedly mounted to the foldable wing tip portion 9 via a rod 45 that extends away from an inner side 47 of the foldable wing tip portion 9 opposite the tip point 41.

The output 27 is spaced apart from the first hinge 11 in a span direction 49 of the fixed wing 5. Further, wherein the ratio of a distance between the output 27 and the second hinge 29 to a distance between the first hinge 11 and the third hinge 31 is approximately 0.8. The ratio of a distance between the output 27 and the first hinge 11 to a distance between the first hinge 11 and the third hinge 31 is approximately 0.42. Also, in both the extended position 15 and the folded position 17 of the foldable wing tip portion 9 the third hinge 31 is positioned lower than the output 27, with respect to a thickness direction 51 of the fixed wing 5.

When the foldable wing tip portion 9 is moved between the extended position 15 and the folded position 17 the first link element 23 rotates about an angle of approximately 150°, while the foldable wing tip portion 9 rotates about an angle of approximately 90°.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft comprising:
 a fixed wing,
 a foldable wing tip portion mounted to the fixed wing via
  a first hinge rotatable about a first hinge axis, wherein
  the first hinge axis extends through an end of the
  foldable wing tip portion and an end of the fixed wing,
  and the foldable wing tip portion rotates about the first
  hinge axis between an extended position and a folded
  position, and
 an actuation unit configured to actuate the foldable wing
  tip portion to move about the first hinge axis, wherein the actuation unit is arranged at one of the fixed wing and the foldable wing tip portion, and is coupled to the other of the fixed wing and the foldable wing tip portion via a linkage including a first link element and a second link element, wherein the first link element is mounted to a rotatable output of the actuation unit and is rotatably coupled to the second link element via a second hinge, wherein the second link element is rotatably coupled to the other of the fixed wing and the foldable wing tip portion via a third hinge, and wherein the first link element and the second link elements are within the fixed wing while the wing tip portion is in the extended position, and extend out from the fixed wing while the wing tip portion is in the folded position.

2. The wing according to claim 1, wherein the actuation unit is arranged at the fixed wing and is coupled to the foldable wing tip portion via the linkage, wherein the second link element is rotatably coupled to the foldable wing tip portion via the third hinge.

3. The wing according to claim 1, wherein the output rotates about an output axis, wherein the second hinge defines a second hinge axis, and wherein the third hinge defines a third hinge axis, and wherein at least one of the output axis, the second hinge axis and the third hinge axis extend in parallel to the first hinge axis.

4. The wing according to claim 2, wherein the third hinge is spaced apart from the first hinge in a tip thickness direction of the foldable wing tip portion.

5. The wing according to claim 4, wherein at least in the extended position of the foldable wing tip portion, the third hinge is positioned lower than the first hinge when viewed in the tip thickness direction of the foldable wing tip portion.

6. The wing according to claim 2, wherein a distance between the third hinge and a tip point of the foldable wing tip portion is greater than a distance between the first hinge and the tip point, when viewed in a tip span direction of the foldable wing tip portion.

7. The wing according to claim 6, wherein the third hinge is fixedly mounted to the foldable wing tip portion via a rod that extends away from an inner side of the foldable wing tip portion.

8. The wing according to claim 2, wherein the output is spaced apart from the first hinge in a span direction of the fixed wing.

9. The wing according to claim 1, wherein a ratio of a distance between the output and the second hinge to a distance between the first hinge and the third hinge is below 1.

10. The wing according to claim 1, wherein a ratio of a distance between the output and the first hinge to a distance between the first hinge and the third hinge is in a range of 0.3 and 0.6.

11. The wing according to claim 1, wherein when the foldable wing tip portion is moved between the extended position and the folded position the first link element rotates about an angle in a range of 120 degrees to 180 degrees, while the foldable wing tip portion rotates about an angle in a range of 70 degrees to 100 degrees.

12. The wing according to claim 2, wherein at least in the extended position of the foldable wing tip portion, the third hinge is positioned lower than the output when viewed in a thickness direction of the fixed wing.

13. An aircraft wing assembly including:

a fixed wing, a wing tip portion coupled to the fixed wing at a first hinge which rotates about a first hinge axis as the wing tip portion moves between an extended position and a folded position, wherein the first hinge axis extends through an end of the wing tip portion and an end of the fixed wing, and an actuation unit mounted within the fixed wing and configured to move the foldable wing tip portion about the first hinge axis, wherein the actuation unit includes a rotatable output;

a first link element having a first end portion attached to the rotatable output of the actuation unit, wherein the rotatable output turns the first end portion and rotates the first link element about an output axis perpendicular to the first link element; and a second link element having a first end section coupled to and moved by the first link element and a second end coupled to a location on the wing tip portion offset from the first hinge axis, wherein rotation of the rotatable output turns the first link element and moves to second link element to move the wing tip portion between the extended position and the folded positon, and wherein the first link element and the second link element are within the fixed wing while the wing tip portion is in the extended position, and extend out from the fixed wing while the wing tip portion is in the folded position.

14. The aircraft wing assembly of claim 13, wherein the fixed wing includes an outer wing skin, and the first and second link elements are within the wing skin while the wing tip portion is in the extended position and extend beyond the wing skin while the wing tip portion is in the folded position.

15. The aircraft wing assembly of claim 13 wherein the wing tip portion includes a rod having an end coupled to the second end of the second link element and the rod extends into the fixed wing while the wing tip portion is in the extended position and the rod is offset from the fixed wing while the wing tip portion is in the folded position.

16. The aircraft wing assembly of claim 13 wherein a rotational axis of the rotatable output of the actuation unit is offset from the first hinge axis and the first link element rotates about the rotational axis.

17. The wing of claim 3, wherein the output axis of the rotatable output is perpendicular to first link element, and wherein a first end region of the first link element is mounted to the rotatable output of the actuation unit such that the first link element rotates about the output axis.

* * * * *